United States Patent [19]

Davis et al.

[11] 3,907,858

[45] Sept. 23, 1975

[54] PROCESS OF MANUFACTURING NITRILOTRIACETONITRILE

[75] Inventors: Kenneth E. Davis, Ossining; Kyung S. Shim, Dobbs Ferry, both of N.Y.

[73] Assignee: Stauffer Chemical Company, New York, N.Y.

[22] Filed: Nov. 8, 1971

[21] Appl. No.: 198,027

Related U.S. Application Data

[63] Continuation of Ser. No. 678,971, Oct. 30, 1967, abandoned.

[52] U.S. Cl. ............................................ 260/465.5 A
[51] Int. Cl.$^2$ ......................................... C07C 120/00
[58] Field of Search ............................... 260/465.5 A

[56] References Cited
UNITED STATES PATENTS

| | | | |
|---|---|---|---|
| 2,405,966 | 8/1946 | Loder | 260/465.5 A |
| 2,855,428 | 10/1958 | Singer et al. | 260/465.5 A |
| 3,061,628 | 10/1962 | Singer, Jr. et al. | 260/465.5 A |
| 3,424,783 | 1/1969 | Harper et al. | 260/465.5 A |
| 3,463,805 | 8/1969 | Morgan et al. | 260/465.5 A |
| 3,504,011 | 3/1970 | Gandhi | 260/465.5 A |
| 3,515,742 | 6/1970 | Morgan et al. | 260/465.5 A |
| 3,679,728 | 7/1972 | Morgan et al. | 260/465.5 A |
| 3,679,729 | 7/1972 | Daniels | 260/465.5 A |

FOREIGN PATENTS OR APPLICATIONS

| | | | |
|---|---|---|---|
| 1,443,328 | 5/1966 | France | 260/465.5 A |

*Primary Examiner*—Joseph P. Brust

[57] ABSTRACT

A process for manufacturing nitrilotriacetonitrile consisting of reacting stoichiometric aqueous portions of ammonia, formaldehyde and hydrogen cyanide in the presence of an acid. The reaction is carried out continuously at critical temperatures of above 120°C. and at autogeneous pressure to maintain homogeneous reaction conditions. The reaction product in the liquid phase is quenched to below 90°C. to minimize hydrolysis of the nitrile and to precipitate the reaction product.

7 Claims, 2 Drawing Figures

US Patent  Sept. 23,1975  3,907,858

INVENTORS
KENNETH E. DAVIS
KYUNG S. SHIM
BY Daniel C. Bloch
ATTORNEY

PROCESS OF MANUFACTURING NITRILOTRIACETONITRILE

This application is a continuation of our copending application Ser. No. 678,971, filed Oct. 30, 1967, now abandoned.

BACKGROUND OF THE INVENTION

Nitrilotriacetonitrile (hereinafter referred to as NTN) is an old and well known composition and may be described as a white crystalline solid having a melting point of between 126°–128°C., that is insoluble in water. This material finds uses as highly reactive intermediates and as a chelating agent.

Prior processes for manufacturing the NTN involve the reaction of ammonia, formaldehyde, and hydrogen cyanide in the presence of a mineral acid. The ingredients were usually introduced into a reaction vessel and agitated with a stirring mechanism to bring about intimate contact of the various components. The reaction of these components is carried out at atmospheric pressure at a temperature ranging from room temperature up to 80°C. Under these prevailing reaction conditions, the reaction medium becomes heterogeneous, with the continual formation of solid intermediates and products. When these components are reacted together at room temperature the NTN is formed within 3 to 6 days. However, at the upper level of 75°C., this time can be reduced to 4 to 5 hours. When the reaction is complete, the NTN, in a crystalline form, can be recovered and washed in good yields.

Various alternatives have been proposed, one of which involves the reaction of ammonia and formaldehyde to form hexamethylenetetraamine. The hexamethylenetetraamine is then introduced into a reaction vessel and agitated with hydrogen cyanide and additional formaldehyde in the presence of a mineral acid to form NTN as the end product. Again, these reactions take place at either room temperature or up to 80°C., resulting in a heterogeneous medium. Also, at these temperatures the formation of NTN from the reaction products takes from 3 to 5 hours, also in relatively good yields.

Another method of forming the NTN product is to react ammonium sulfate, formaldehyde and hydrogen cyanide in an aqueous acidic medium to form NTN. However, this reaction is even more sluggish than the previous method. Moreover, because of the long reaction time requirements, and because of the heterogeneous nature of the reaction, all the known methods of forming NTN are limited to batch process operations at temperatures of up to 80°C., and at atmospheric pressure. At these temperatures and pressures, the large in-process inventories of hydrogen cyanide necessitates the use of especially designed safety equipment to maintain control of the high exothermic reaction and volatility of the unreacted hydrogen cyanide. These precautions must be maintained because of the highly toxic nature of the material employed. This, of course, requires a large capital investment. Moreover, the time involved of up to four to five hours to produce a commercial yield of the NTN product materially increases the cost thereof. Thus, there is a need in the industry for forming the NTN composition at materially reduced rates or times, yet retaining the high yield of over 80% necessary for commercialization.

BRIEF DESCRIPTION OF THE INVENTION

It has been discovered that above 120°C., and under superatmospheric pressure, preferably autogeneous pressure, an aqueous mixture of ammonia, formaldehyde and hydrogen cyanide can be reacted without the formation of solid reaction products and with a significant reduction in reaction time. In its preferred form, hexamethylenetetraamine is formed from formaldehyde and ammonia and is then reacted with hydrogen cyanide in the presence of additional formaldehyde and an aqueous medium, preferably sulfuric acid, to form the NTN product. The total time for the reaction of the hexamethylenetetraamine with the hydrogen cyanide and formaldehyde to form the NTN product has shown to be less than thirty minutes. Moreover, this reaction is adapted to a continuous process wherein the materials are maintained in a liquid state. Thus, a homogeneous reaction or process is maintained so as to prevent difficulties in handling the heterogeneous or liquid solids reaction.

DETAILED DESCRIPTION OF THE INVENTION

Figure 1:
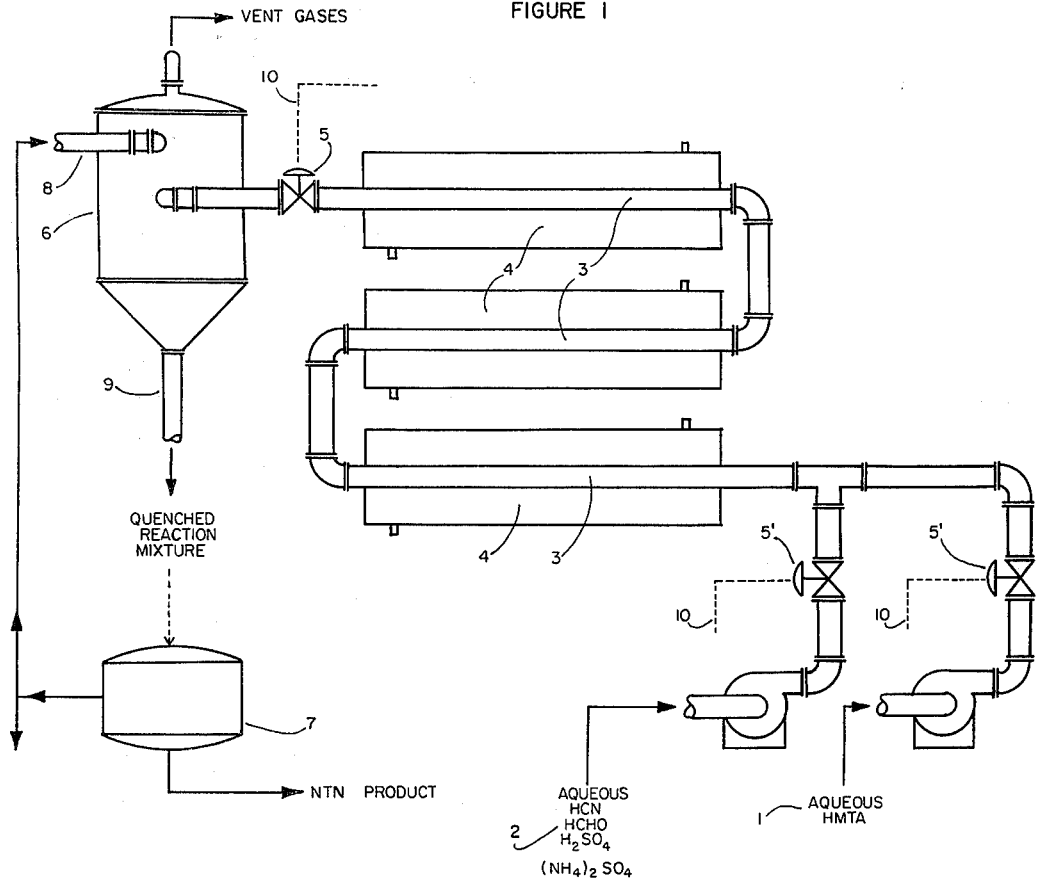
FIG. 1 is a diagram illustrating the process of the present invention.

In the practice of the present invention, ammonia, formaldehyde, and hydrogen cyanide are reacted together under aqueous acid conditions and at critical temperatures and at autogeneous pressure to produce NTN. In its preferred form, ammonia is first reacted with formaldehyde to form hexamethylenetetraamine (hereinafter referred to as HMTA) in a conventional manner. This reaction is carried out in a reactor with the components being in the aqueous phase. The HMTA can then be reacted with hydrogen cyanide in the presence of additional formaldehyde under acid conditions to form the NTN product. This, HMTA, formaldehyde, and hydrogen cyanide are contacted within a reactor to form the NTN product. In its preferred form, the mineral acid employed is sulfuric acid, although other acids such as hydrochloric acid and phosphoric acid can be used.

It is essential to the practice of the present invention that the temperature within the reactor be maintained at least above 120°C. The reactor vessel should also be under pressure, preferably autogeneous pressure of about 5 to 100 psig. By maintaining the reactor vessel under pressure in this manner, the hydrogen cyanide at the temperatures involved will be essentially in a liquid state. In its preferred form, the reactor is of longitudinal or tubular plug-flow design to minimize backmixing and to minimize vaporization of the reactants and solvents. Also, the reactor may be of a spiral configuration which will materially reduce the length of the reactor and minimize the space needed for the process. The spiral configuration will also prevent backmixing and will minimize the vaporization of the reactants and solvents. Under operating conditions, the reactor will provide turbulence so that there will be intimate contact between the hydrogen cyanide and the HMTA and formaldehyde to give fast reaction. It has been found in practice that a pH of 5 or below must be maintained, although it is preferred to be at least below 3. By maintaining these conditions within the reactor, it has been found that high yields of the NTN product can be formed within a period of from 1 to 30 minutes. This is clearly contrasted to what has been known in the prior art in the batch system which takes from 3 to 5 hours.

After the NTN product has been formed, it is immediately conveyed to a quenching station where it is rapidly cooled to at least below 90°C., preferably below 50°C., to avoid hydrolysis of the produce and to precipitate the NTN product and thus convert it from a liquid to a solid state. If there is a large time lapse between the reaction and the quenching, the NTN product will hydrolyze in the acid medium, resulting in a reduced yield. The NTN solid product is then conveyed to a cyclone, centrifuge or other suitable solids-liquid separation device where it is separated from the acid medium, washed and purified. The acid medium is then recycled back into the reaction and quenching systems along with a small amount of ammonium salt formed from the ammonia liberated during hydrolysis.

Referring now to FIG. 1 of the drawings, the numeral 1 designates a source of HMTA that is pumped into the reactor tube 3. The numeral 2 designates a source of a mixture of hydrogen cyanide, formaldehyde, sulfuric acid with traces of ammonium salt that is pumped into the reactor tube 3. These materials are conveyed to the longitudinal or tubular reactor 3 that is maintained at a temperature of above 120°C., with a suitable heat transfer medium 4. Throttle valves 5 and 5' are provided at the ends of the reactor 3 to maintain autogeneous pressure. The pressure within the tubular reactor can range up to about 100 psig. The valves 5 and 5' are connected to a conventional flow controller as indicated at 10. By maintaining the temperature within the reactor 3 of at least 120°C., the NTN product formed will be maintained in a liquid state. After the NTN product is formed, it is conveyed to a quenching station 6, where it is cooled by an aqueous medium conveyed through pipe 8. The NTN product and acid medium are conveyed through pipe 9 to a solids-liquid separator 7 where the acid is separated from the NTN product. If desired, part of the acid can be conveyed into the pipe 8 and used for quenching. Thus, by maintaining these pressures and temperature conditions within the reactor 3, the residence time of the reactants, HMTA and hydrogen cyanide and formaldehyde to form the NTN product, will be approximately 5 minutes. The NTN product can then be used in forming sodium nitrilotriacetate that is well known in the art as a detergent builder.

It should be noted that the reactants of the present invention, that is ammonia, formaldehyde and hydrogen cyanide, can all three be charged to the tubular reactor 3 without previously reacting the ammonia and formaldehyde as described herein. This reaction is substantially identical with reacting HMTA with hydrogen cyanide and formaldehyde and takes place under identical conditions. Furthermore, since the reactants of the present invention are maintained within the reaction tube 3 for only a short length of time, the problem with other competing reactions at high temperatures is substantially eliminated. These competing reactions may be defined as the formation of intermediate nitriles along with the NTN product and a second reaction of the hydrolysis of the nitrile formed under the prevailing acid reaction conditions. Thus, high yields of the NTN product can be achieved according to the process of the present invention.

The following examples illustrate the invention:

EXAMPLE 1

The reactants of the present invention were blended together by adding 243 grams of a 37% solution of formaldehyde, 3 moles, to a mixture of 25 grams of water and 25 grams of concentrated sulfuric acid, 0.25 moles, dropwise at ice temperature followed by 58.6 grams of a 29% solution of ammonia, 1 mole, and 86 grams of hydrogen cyanide, 3 moles, into a mixing vessel. The pH of the reagents was determined to be 2. The temperature of the mixed reagents were cooled by dry ice and maintained at a temperature of below 10°C.

EXAMPLE 2

A 5 gallon vessel equipped with a mechanical stirrer and heater was filled with five gallons of silicone oil. The temperatures of the oil were controlled by means of a thermoregulator. Seven test tubes were obtained and filled approximately half full, about 5 milliliters, with the mixture of reagents of Example 1. The test tubes were sealed and maintained at below 10°C. Seven runs were then conducted with the seven test tubes filled with the reactants of Example 1 at 5 minutes duration and at temperatures of 91°C., 115°C., 117°C., 120°C., 122°C., 130°C., and 142°C. Yields are tabulated below:

TABLE 1

| Reaction Temperature °C. | Yield % |
|---|---|
| 91 | 73 |
| 115 | 75 |
| 117 | 75 |
| 120 | 76 |
| 122 | 81 |
| 130 | 86 |
| 142 | 79 |

Figure 2:
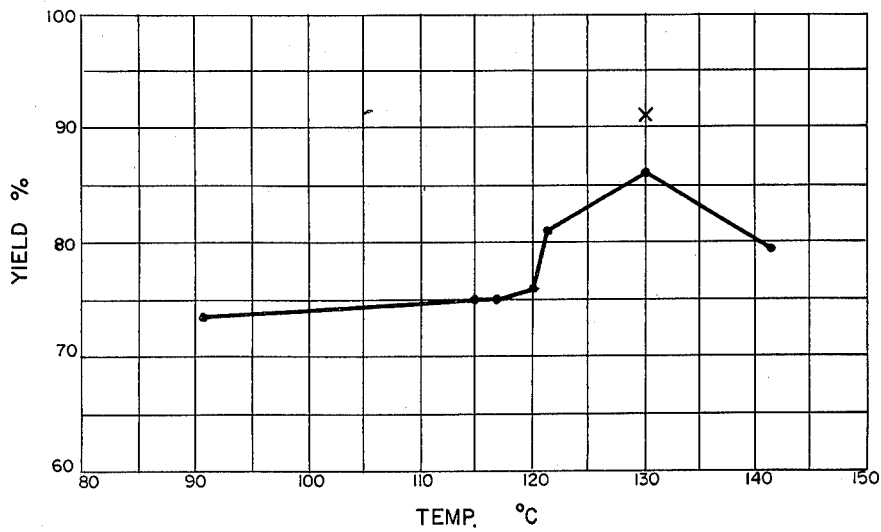
FIG. 2 is a graph illustrating the yield vs. the temperature when practicing the present invention.

The results of Example 2 tabulated above have been plotted and illustrated in FIG. 2. FIG. 2 clearly illustrates that at temperatures below 120° the yields are substantially the same. However, at temperatures above 120°C. the yields sharply increase to commercial proportions. Thus, a critical temperature of above 120° for the reaction temperature of the process of the present invention is established.

EXAMPLE 3

Hexamethylenetetraamine was reacted with formaldehyde, hydrogen cyanide and sulfuric acid at 130°C. The amount of reactions were stoichiometric portions. The yields obtained using five different samples are tabulated below:

TABLE 2

| Reaction Time (minutes) | Yields % |
|---|---|
| 5 | 86 |
| 7 | 75 |
| 10 | 73 |

EXAMPLE 4

The procedure as outlined in Example 3 was repeated in its entirety except the temperature was 142°C. The results obtained using three different samples are tabulated below:

TABLE 3

| Reaction Time (Minutes) | Yield % |
|---|---|
| 5 | 79 |
| 7 | 76 |
| 10 | 70 |

EXAMPLE 5

Using a one inch diameter, ten foot long tubular reaction, equipped for a continuous operation similar to that described in FIG. 1, wherein the reactor was maintained at a controlled temperature of 130°C., with a heat transfer medium, a 40 weight percent HMTA solution was continuously contacted with an aqueous solution consisting of 13.9 weight percent formaldehyde, 26.2 weight percent hydrogen cyanide and 7.7 weight percent concentrated sulfuric acid. Flow rates to the reactor were controlled so as to maintain a weight ratio between the solutions of 1 to 3.8 and a residence time within a reactor of 3 to 5 minutes. The reactor discharge was quenched from 130°C. to about 50°C., using a liquid cyclone with an acidic quench medium consisting essentially of dilute sulfuric acid. NTN crystallized immediately on contact of the reactor discharged with the quench medium. The resultant slurry was filtered using a rubber lined centrifuge and the NTN product was washed several times with water. After drying the product to remove residual moisture, a total of 120 pounds of high purity NTN product was obtained, corresponding to a yield of 91%.

Referring now to FIG. 2, the yield of the above example has been plotted thereon and indicated at *x*. It should be noted that this yield has not been plotted on the curve since the curve represents different conditions to produce the yields obtained. However, it should be noted that this example is a pilot plant operation which simulates commercial production. The 91% yield at a residence time of 3 to 5 minutes at the temperatures involved was unexpected.

A comparison of Examples 3 and 4 shows that at a residence time of over 10 minutes, the yields begin to be sharply reduced. This is apparently due to hydrolysis of the NTN product.

What is claimed is:

1. A continuous process for manufacturing nitrilotriacetonitrile which comprises: continuously bringing into reactive contact for a period of from about one to about 30 minutes, under superatmospheric pressure, at a temperature between about 120°C. and the temperature at which the autogenous pressure is about 100 pounds per square inch gauge, in an aqueous liquid mixture, at a pH maintained below 5 by addition of a mineral acid, hexamethylenetetramine or equivalent quantities of ammonia and formaldehyde with formaldehyde and hydrogen cyanide, said hexamethylenetetramine or equivalent quantities of ammonia and formaldehyde, hydrogen cyanide and formaldehyde being provided in amounts which are stoichiometrically necessary to convert the ammonia to nitrilotriacetonitrile, to form a liquid reaction mixture containing nitrilotriacetonitrile, continuously conveying the liquid reaction mixture containing the nitrilotriacetonitrile product to a quenching means to rapidly cool said aqueous liquid reaction mixture to at least below 90°C. to precipitate the nitrilotriacetonitrile produce and continuously recovering the nitrilotriacetonitrile product.

2. The process of claim 1 wherein the reactive contact is at a temperature between about 120°C. and about 142°C.

3. The process of claim 1 wherein the reactive contact is at a temperature between 125°C. and 135°C.

4. The process of claim 1 wherein the superatmospheric pressure is between about 5 and about 100 pounds per square inch gauge.

5. The process of claim 1 wherein the reaction mixture containing the nitrilotriacetonitrile product is rapidly cooled to a temperature below 50°C.

6. The process as set forth in claim 1 wherein the mineral acid is sulfuric acid.

7. The process of claim 1 wherein the pH is maintained below 3.

* * * * *